United States Patent [19]
Kubath et al.

[11] 3,941,430
[45] Mar. 2, 1976

[54] ELECTRICALLY CONTROLLED LOAD-RESPONSIVE AIR BRAKING SYSTEM

[75] Inventors: Gerhard Kubath; Hans Pöllinger, both of Munich, Germany

[73] Assignee: Knorr-Bremse GmbH, Munich, Germany

[22] Filed: Dec. 18, 1974

[21] Appl. No.: 533,836

[30] Foreign Application Priority Data
Dec. 18, 1973 Germany............................ 2362800

[52] U.S. Cl................... 303/22 R; 188/195; 303/3
[51] Int. Cl.² .......................................... B60T 8/18
[58] Field of Search .......... 303/22, 23, 2, 3, 15, 68, 303/71; 188/195

[56] References Cited
UNITED STATES PATENTS

| 3,068,050 | 12/1962 | Pekrul | 303/22 R X |
|---|---|---|---|
| 3,425,752 | 2/1969 | Pöllinger et al. | 303/22 A X |
| 3,503,656 | 3/1970 | Shattock et al. | 303/22 R |
| 3,653,729 | 4/1972 | Newell et al. | 303/15 X |
| 3,716,274 | 2/1973 | Pier | 303/22 R X |

FOREIGN PATENTS OR APPLICATIONS

| 254,114 | 2/1963 | Australia | 303/22 R |

*Primary Examiner*—Trygve M. Blix
*Assistant Examiner*—Douglas C. Butler
*Attorney, Agent, or Firm*—Edmund M. Jaskiewicz

[57] ABSTRACT

In a load-responsive air braking system for a railway vehicle an electrical signal is transmitted from a brake controller actuated by an operator when he intends to apply a braking force. The signal is transmitted to a signal converter consisting of an electromagnet having a movable armature therein which contacts an end of a balance beam with a force corresponding to the electrical signal. The balance beam actuates a double valve which has a vent to the atmosphere and is connected between the braking cylinder and an air reservoir.

2 Claims, 3 Drawing Figures

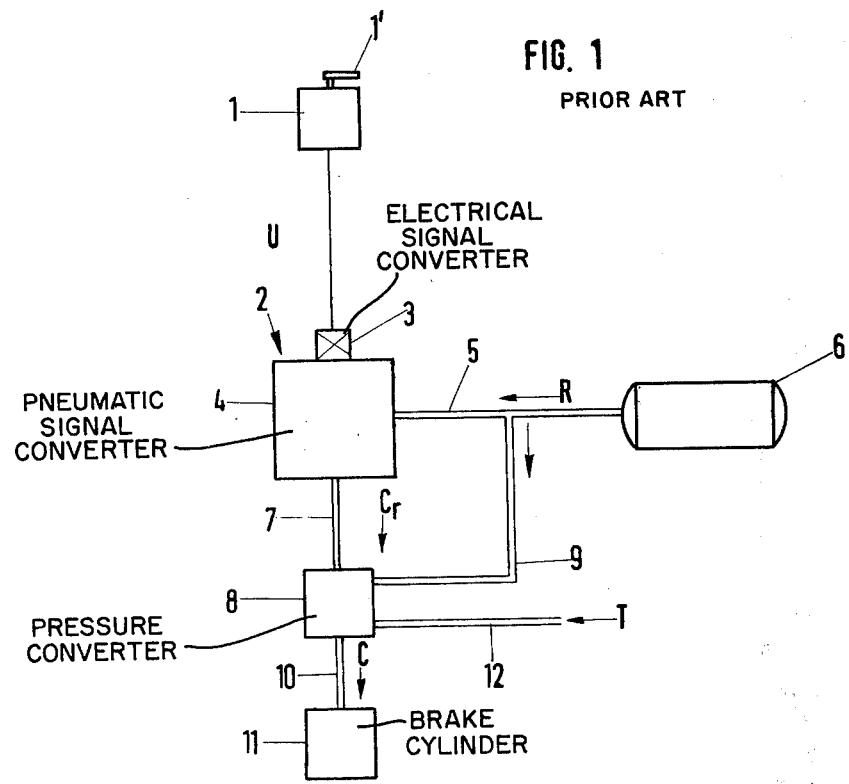
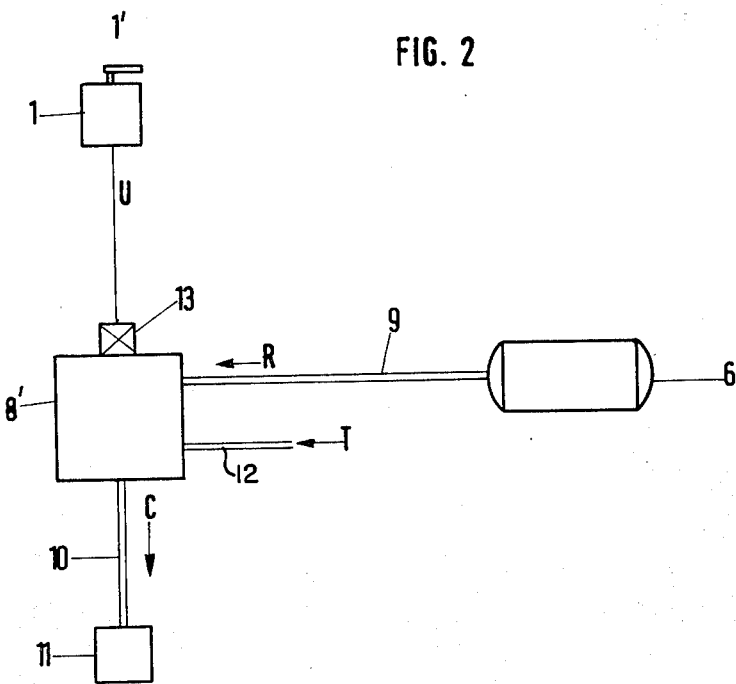

ELECTRICALLY CONTROLLED LOAD-RESPONSIVE AIR BRAKING SYSTEM

The present invention relates to an electrically controlled load-responsive air braking system for railway vehicles, more particularly, to such a system wherein an electrical signal corresponding to the intended braking force directly controls the operation of the braking system.

Air braking systems for railway vehicles have been provided wherein the system is electrically controlled and responsive to the load on the vehicle. Such a system generally comprises a signal transmitter for transmitting an electrical signal corresponding to the specific intended braking force to be applied by the system. A signal converter converts the electrical signal into a servo or control pressure. The control pressure is then converted by a pressure converter which is adjustable as a function of the load on the vehicle and comprises a balance beam one end of which is loaded by the control pressure and the other end is loaded by a brake pressure force corresponding to the brake pressure introduced into the braking cylinder. The balance beam controls a double valve that connects a source of pressure such as an air reservoir to the braking cylinder when the control pressure is predominant and which vents the brake cylinder to the atmosphere when the brake pressure force is predominant. The fulcrum support for the balance beam is displaceable in order to provide for a load-responsive setting of the pressure converter. Adjustment of the fulcrum support may be carried out by means of a servo piston which is subjected to a pressure corresponding to the load on the vehicle and acting against a spring force.

In one such air braking system the signal converter consists of a brake control valve which communicates with a brake pressure reservoir. The brake control valve is actuated by an electrical signal which corresponds to the braking force intended by the operator to be applied by the braking system. The electrical signal is generated by a corresponding pivoting of a control lever on the operator's brake control valve. The brake control valve thus produces a control pressure, corresponding to the electrical signal, to a first piston whose piston rod connects an end of a balance beam of the pressure converter or transducer. The other end of the balance beam is connected by the piston rod of a second piston of the pressure converter that is subjected to the specific brake cylinder pressure.

In such a known electrically controlled load-responsive air braking system the operator's brake control valve generates an electrical signal which corresponds to the specific angle to which the control lever is pivoted and this signal is then converted by an electro-pneumatic signal transducer into a control pressure. As a function of a specific load of the vehicle the load-brake valve produces an intensified brake cylinder pressure corresponding to the control pressure for the purpose of acting on the braking cylinder.

Such an air braking system has the disadvantage that it consists of a large number of pneumatic lines and a rather large and complicated assembly of apparatus. Further, the response time of the compressed air brake has been found to be relatively slow with respect to the operating conditions encountered in railroading practice.

It is therefore the principal object of the present invention to provide a novel and improved electrically controlled air braking system for railway vehicles.

It is another object of the present invention to provide an electrically controlled air braking system for railway vehicles which has an improved and simpler operation and a quicker response time of the air brake while at the same time having a simpler structure and being lower in cost.

It is a further object of the present invention to provide an electrically controlled load-responsive air braking system for railway vehicles which has a more accurate and precise operation and a shorter response time while simplifying and reducing the structure and pneumatic lines required.

According to one aspect of the present invention a load-responsive air braking system for railway vehicles may be provided with a device for controlling the air braking system in which there is a balance beam one end of which is subjected to the brake cylinder pressure. The balance beam actuates a double valve means connecting the brake cylinder to either a source of pressure or to the atmosphere. The beam is supported by an adjustable fulcrum whose position is varied in response to the load on the vehicle in order to vary the conversion ratio of the beam as a function of the vehicle load. There are also provided electromagnetic means including a movable armature acting against the other end of the beam. The electromagnetic means is actuated by an electrical signal transmitted from the operator's control valve and corresponding to the specific braking force to be applied. When an electrical signal is received such that the brake cylinder pressure acting on the beam is predominant the double valve is actuated to connect the brake cylinder to the atmosphere. When an electrical signal is received such that the force applied by the armature is predominant the double valve is actuated to connect the braking cylinder to the source of pressure.

Thus, according to the present invention the signal converter consists of the electromagnet whose movable armature contacts an end of the balance beam of the pressure converter with a force which corresponds to the electrical signal indicative of the braking force to be applied. The invention thus eliminates the need for the conventional control valve previously employed as a voltage pressure transducer in order to generate a control pressure in response to the received electrical signal. The corresponding pneumatic lines necessitated by this control pressure are also eliminated so as to significantly simplify the structure of the braking system.

It is thus apparent that in place of a piston subjected to the action of the control pressure the force produced by an electromagnet and corresponding to the received electrical signal acts directly on an end of the balance beam of the pressure converter. The present invention thus enables a more precise and less expensive operation of the air braking system and significantly decreases the response time of the air brakes in comparison with known air brakes because of the elimination of the intermediate conversion stage previously required to convert the electrical signal into a control pressure.

Other objects and advantages of the present invention will be apparent upon reference to the accompanying description when taken in conjunction with the following drawings, which are exemplary, wherein;

FIG. 1 is a schematic representation of the circuit of a prior art electrically controlled load-responsive air braking system;

FIG. 2 is a view similar to that of FIG. 1 but showing the circuit diagram of the air braking system of the present invention.

Proceeding next to the drawings wherein like reference symbols indicate the same parts throughout the various views a specific embodiment of the present invention will be described in detail.

Figure 3:
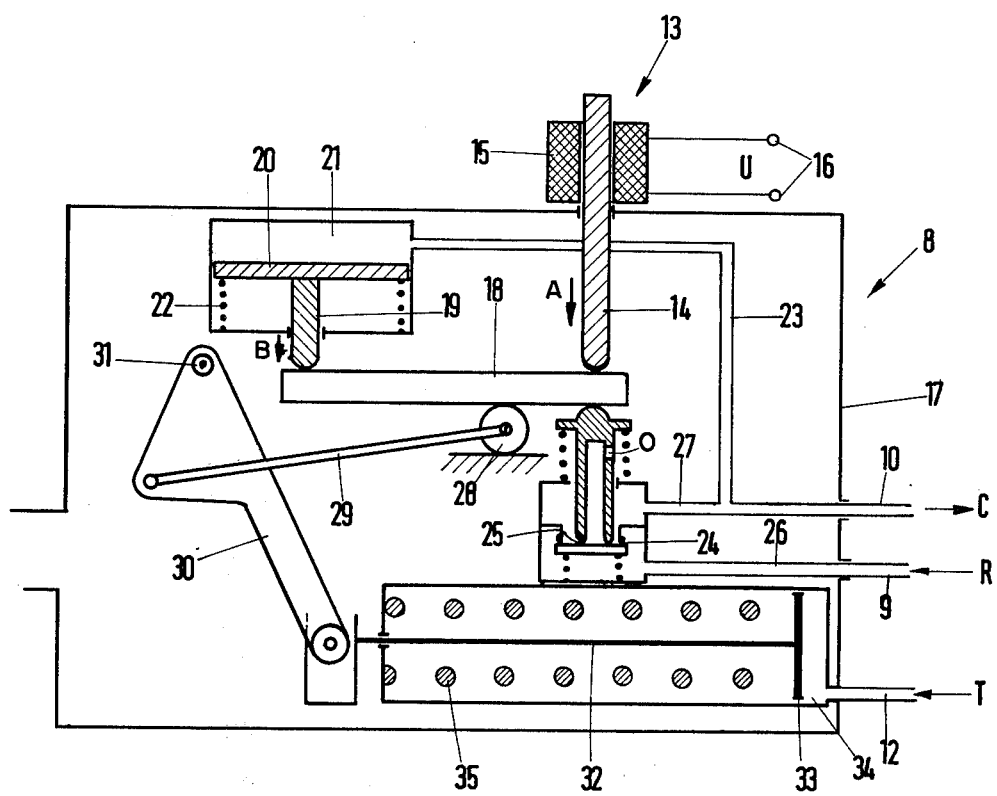
FIG. 3 is a partial schematic and sectional view of a pressure converter according to the present invention and employed in the circuit of FIG. 2.

As shown in FIG. 1, a known electrically controlled load-responsive air braking system for a railway vehicle comprises a signal transmitter 1 of the operator's brake valve type. The signal transmitter comprises a pivotable control lever 1' which when pivoted generates an electrical voltage U corresponding to the specific braking force intended by the operator to be applied by the air brake. The electrical signal U is received by an electro-pneumatic signal converter 2 comprising an electrical portion 3 and a pneumatic portion 4 which is connected through an air line 5 to a brake pressure reservoir 6 and through a second air line 7 to a pressure converter or transducer 8. The brake pressure reservoir 6 is also connected through an air line 9 directly to the pressure converter 8. The pressure converter 8 is also connected through an air line 10 to a brake cylinder 11. The pressure converter 8 is also connected through a line 12 to a vehicle load indicator so that the pressure converter is subjected to the action of a load-responsive control pressure T.

In operation, a control pressure $C_r$ which is proportional to the voltage U is transmitted to signal converter 2 through air line 7 to the pressure converter 8 which is additionally subjected through line 9 to a pressure R to the reservoir 6 and through line 12 to a load-responsive control pressure T. As a function of the control pressure $C_r$ and load-responsive control pressure T, the pressure converter will release through air line 10 a brake pressure C to the brake cylinder 11. A known pressure converter of a pneumatically controlled air brake is disclosed in the German Pat. No. 1,279,710.

By referring to FIG. 2 which illustrates the air braking system of the present invention it will be apparent that the present system is simpler in that several of the components of the system of FIG. 1 have been eliminated. The braking system of the present invention does not require an electrical-pressure converter in order to generate a control pressure $C_r$ responsive to the electrical signal voltage U. In addition, the air lines 5 and 7 leading to the reservoir 6 and pressure converter 8 respectively and connected to the electro-pneumatic converter 4 are also eliminated.

In the air braking system of the present invention a voltage U transmitted by the signal transmitter or operator's brake valve 1 is introduced to an electro-mechanical signal converter 13 having a movable armature 14 therein. The armature 14 acts with a force proportional to the voltage U and corresponding to the pressure $C_r$ of the prior art air braking system. The pressure converter 8' is additionally subjected to pressures R and T through the air lines 9 and 12 respectively similar to that of the prior art braking system. An electromagnet whose armature force is a function of the current flowing in the magnet has been disclosed in the German printed patent specification No. 1,444,316.

The pressure converter 8' of the present invention is illustrated in greater detail in FIG. 3 together with a electro-mechanical signal transducer 13 which essentially consists of an armature 14 and a coil 15 for displacing the armature in the direction of the arrow A when a voltage U is applied to the electrical connection 16 of coil 14 to energize the coil.

The electromagnet 13 is mounted on a housing 17 of pressure converter 8' so that both components may form a single structural unit. The pressure converter 8' includes a balance beam 18 one end of which is contacted by the movable armature 14 of the electromagnet 13. The other end of balance beam 18 supports a piston rod 19 of a piston 20 which is axially displaceable in a cylinder 21 in the direction of the arrow B against the force of a spring 22. The cylinder 21 is connected through an air line 23 to the air line 10 (FIG. 2) which leads to the braking cylinder 11.

The balance beam 18 actuates a spring-loaded double valve 24, 25 which has a vent O therein to the atmosphere and which is connected through line 26 to the air reservoir line 9 and is connected through pipe 27 to the brake cylinder line 10. The balance beam 18 is supported on a displaceable pivot bearing or fulcrum 28 which is connected by means of a rod 29 to a bell crank lever 30 pivoted at one end on a fixed pin 31 on housing 17. The other end of the lever 30 is pivotably and vertically displaceably connected to a piston rod 32 extending at almost a right angle to the lever 30. The piston rod 32 is attached to an adjusting or servo piston 33 loaded by pressure T in a cylindrical chamber 34 against the force of a spring 35. The cylinder 34 is thus connected to line 12 of FIG. 2. Accordingly, the position of the fulcrum 28 under the balance beam 28 is shifted as a function of the load on the vehicle as indicated by the pressure T. Thus, the conversion ratio of the pressure converter is adjusted in accordance with the load on the vehicle.

The double valve 24, 25 is illustrated in FIG. 3 in its unactuated condition wherein the balance beam 18 is in equilibrium. Also, the fulcrum 28 is in its zero or no-load position in which position the spring 35 is relaxed and essentially no force is acting on the piston 33.

When it is desired to exhaust or vent brake cylinder 11 in order to apply the brakes, an electrical voltage U is decreased by pivoting the control lever 1' on the signal transmitter 1 by a certain amount corresponding to the desired stage of braking. As a result, the force applied by armature 14 on the balance beam 18 will be decreased correspondingly. The valve 25 will thus be opened to connect the brake cylinder through line 27 to the atmosphere until a new equilibrium is established. At the same time, the line 26 to the air reservoir will be closed.

In order to supply air to the brake cylinder 11 in order to disengage the air brakes, the electrical voltage U is increased by a proper movement of the control lever 1'. As a result, the force applied by armature 14 against the balance beam 18 will be correspondingly increased and the valve 24 will be opened so as to connect lines 26 and 27 to each other. Air will thus be supplied from the air reservoir to the brake cylinder. In accordance with the load on the vehicle, piston 33 and correspondingly fulcrum 28 will be displaced from their no-load positions into a position corresponding to the load on the vehicle. As a result, the conversion ratio on the balance beam will be correspondingly changed.

It is thus apparent that when the force applied by the armature 14 is dominant, lines 26 and 27 will be connected so that the brake cylinder 11 is subjected to pressure R from the air reservoir. When the force applied by piston rod 19 on the other end of the beam 18 is predominant, the double valve 24, 25 is actuated to open valve 25 to connect line 27 to the atmosphere so that the brake cylinder 11 is vented through the lines 10 and 27 until equilibrium is established and the double valve is moved into its shut-off position.

It should be borne in mind that the present invention is not limited to the particular embodiment of the pressure converter or transducer disclosed and described herein.

Instead of operating on the load-current principle as described herein, the signal converter may also be constructed to operate on the static-current or closed-circuit principle wherein the armature 14 is loaded by a spring in the direction of pressure on beam 18. The magnetic coil 15 must then exert a force on the push rod which is proportional to the energization of the coil and directed opposite to the spring loading. When the magnetic coil is fully energized in such an arrangement there is produced a minimum brake pressure in the line 10 which may correspond to the atmospheric pressure and which will increase with decreasing intensity of energization of the magnetic coil.

It will be understood that this invention is susceptible to modification in order to adapt it to different usages and conditions, and accordingly, it is desired to comprehend such modifications within this invention as may fall within the scope of appended claims.

What is claimed is:

1. A device for controlling a load-responsive air brake system on a railway vehicle by an electrical signal, and comprising a balance beam having one end and another end which is subjected to the brake cylinder pressure, double valve means actuated by said beam for connecting the brake cylinder to one of a source of pressure or to the atmosphere, an adjustable fulcrum supporting said beam, means responsive to the load of the vehicle for adjusting said fulcrum to vary the lever arm ratio of forces acting on the ends of the beam as a function of the vehicle load, and electromagnetic means including a movable armature therein acting against said one end of the said beam for receiving an electrical signal whereby when an electrical signal is received such that the brake cylinder pressure acting on the beam is predominant the double valve is actuated to connect the brake cylinder to the atmosphere and when an electrical signal is received such that the force applied by the armature is predominant the double valve is actuated to connect the brake cylinder to the source of pressure.

2. In a device as claimed in claim 1 and further comprising an air reservoir and said double valve having a vent to the atmosphere and connected between said reservoir and said braking cylinder.

* * * * *